United States Patent [19]
Rothman et al.

[11] 3,755,648
[45] Aug. 28, 1973

[54] FLEXIBLE WELDING NOZZLE APPARATUS

[76] Inventors: Julius Rothman, 13702 Beach St., Cerritos, Calif. 90701; Edmond Andrew Tacconelli, 5456 Abbeyfield St., Long Beach, Calif. 90815; Frank Vincent Buzzetta, 11399 Pinetree Ln., Stanton, Calif. 90680

[22] Filed: Sept. 5, 1972

[21] Appl. No.: 285,967

[52] U.S. Cl. ................................ 219/130, 174/47
[51] Int. Cl. ............................................. B23k 9/00
[58] Field of Search ............ 174/130, 122 G, 15 C, 174/47; 219/130

[56] References Cited
UNITED STATES PATENTS
| | | | |
|---|---|---|---|
| 301,417 | 7/1884 | Wilkinson | 174/130 |
| 3,018,321 | 1/1962 | Heckel | 174/122 G |
| 3,056,102 | 9/1962 | Cornell | 174/15 C |
| 3,249,734 | 5/1966 | Meyer | 219/130 |

*Primary Examiner*—E. A. Goldberg
*Attorney*—R. S. Sciascia and Paul N. Critchlow

[57] ABSTRACT

The nozzle of an inert gas arc-welding gun is flexibly extended by coupling an elongate, tubular electrode between the body of the gun and its nozzle. The electrode is formed of spirally-wound conductive wire capable of being bent into any desired configuration needed for the particular job and of retaining its set disposition. A sleeve binds the wound wire electrode to maintain its circularity during bending and insulation is provided around the sleeve. Welding current is carried by the wire and the welding metal in wire form is passed through the bore of the wound wire. A steel spring coaxial with the electrode guides the welding wire. Inert gas is supplied through a passage provided between the insulation and the sleeve.

5 Claims, 4 Drawing Figures

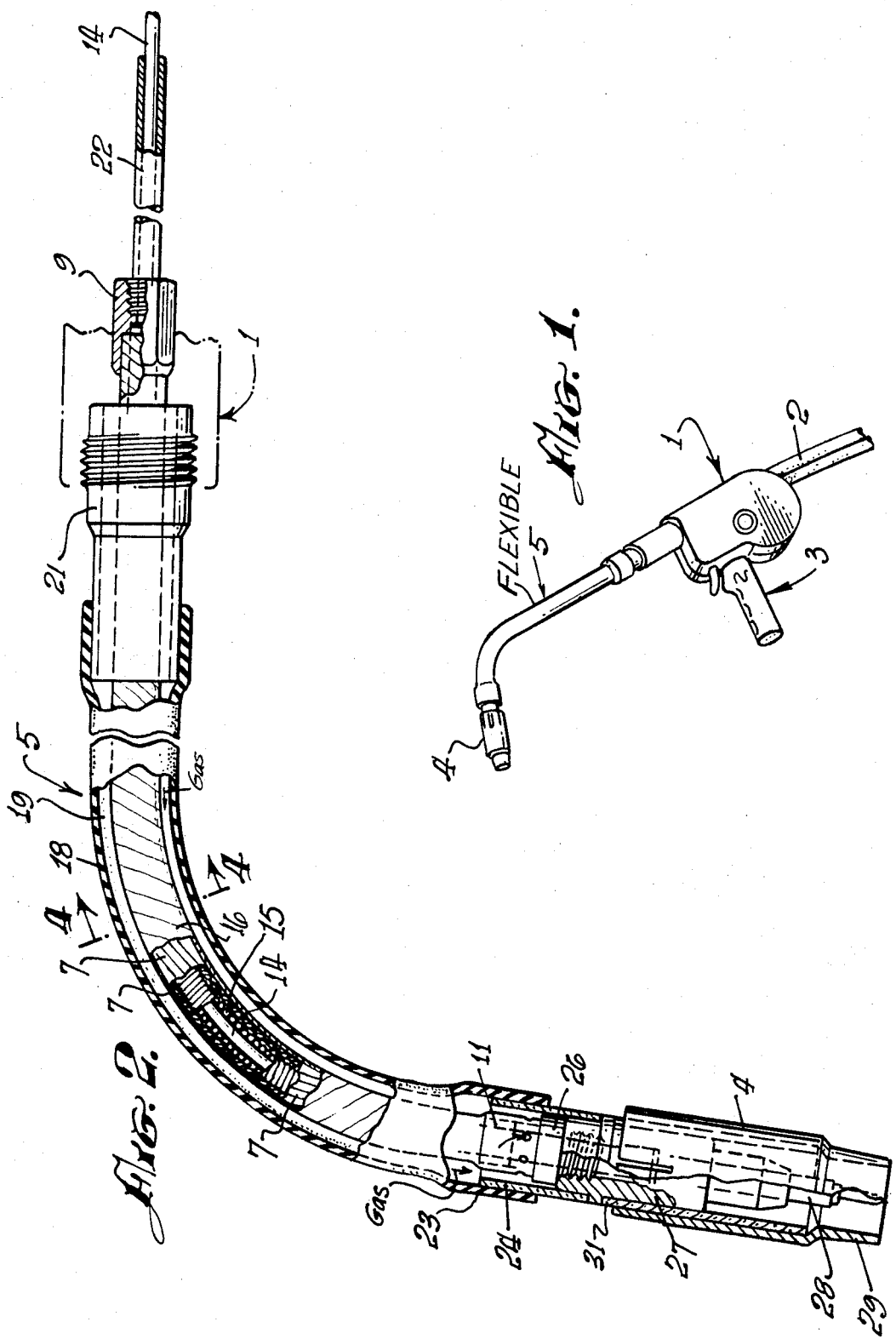

FLEXIBLE WELDING NOZZLE APPARATUS

The invention described herein may be manufactured and used by or for the Government of the United States of America for governmental purposes without the payment of any royalties thereon or therefor.

BACKGROUND OF THE INVENTION

The present invention relates to arc-welding guns and, in particular, to guns of the type having a flexible nozzle adapted to be bent into any desired configuration.

There have been a number of attempts to provide gas metal arc-welding guns with a flexibility that permits the nozzle to be bent into any desired curvature needed for reaching otherwise inaccessible portions of the work to be accomplished. Apparently, however, these attempts have not met with success. One such attempt, for example, employs a flexible electrode, but the electrode is provided as a separate piece coupled externally of a flexible gun barrel which carries the inert gas and welding wire to the point of application. One difficulty with such an arrangement is that the external flexible electrode, even though insulated, may produce damaging and unsafe sparking conditions particularly at the points where the electrode is coupled to the rest of the gun. Also, arrangements of this type have a limited rather than universal flexibility. Another arrangement incorporates the current-carrying electrode within a flexible tube disposed between the body of the gun and its nozzle, but these arrangements appear to be unnecessarily complex due in part to the manners in which they provide for a continuous feed of the welding wire as well as the continuous supply of the inert gas. Of perhaps greater significance, this arrangement uses a sleeve-like, braided electrode which is longitudinally flexible but which, at least, has a limited current-carrying capacity.

It is therefore an object of the present invention to provide a relatively inexpensive, simple, reliable metal arc-welding gun having a flexibility which permits the gun nozzle to be disposed in and to retain any desired bending configuration.

Another object is to provide an attachment for standard welding guns of the type under consideration, the attachment providing the guns with the desired nozzle flexibility.

A further object is to provide a flexible gas metal arc welding gun which has a reverse bend capability if so desired and which, nevertheless, maintains its gas and welding wire passage in an open condition when so bent.

Another object is to provide a gun having the foregoing capabilities, the gun flexibility being provided in such a manner that its nozzle can be bent repeatedly over a long period of time without undue weakening.

A still further object is to provide a gun of this type which has a practically unlimited current-carrying capacity, the gun being capable of operating in a relatively cool and entirely safe manner regardless of the amperage.

Other objects and their attendant advantages will become apparent in the ensuing description.

The objects generally are achieved by employing a flexible, elongate, tubular electrode to provide the flexibility for the nozzle, the electrode being formed of electrically-conductive wire spirally wound to provide a tube-like structure capable of being bent into any set disposition. The electrode, most suitably formed of a multi-strand spiral, is encased in a flexible sleeve which, when the electrode is bent, effectively maintains the convolutions of the spiral in their formed disposition so as to avoid excessive spreading of the convolutions as well as excessive crimping which accompanies the spreading. This sleeve may include or be formed as an insulator, although the preferred arrangement is to directly wrap the bare wire electrode with a glass tape or the like, and to apply an insulating sleeve in a spaced relationship over the tape. Welding current, of course, is supplied through the wire electrode while inert gas frequently used in these welding operations is supplied coaxially of the wire in a manner which will be described. Guide means are mounted in the electrode bore to assure a smooth feeding of the welding wire.

BRIEF DESCRIPTION OF THE DRAWING

The invention is illustrated in the accompanying drawings of which:

FIG. 1 is a side elevational view of a conventional gas metal arc-welding gun employing the flexible electrode arrangement of the present invention;

FIG. 2 is an enlarged view of the electrode arrangement showing certain portions of the arrangements in section and other portions having their external sleeve-like covers partially broken away to show underlying parts;

DETAILED DESCRIPTION OF THE INVENTION

Figure 3:
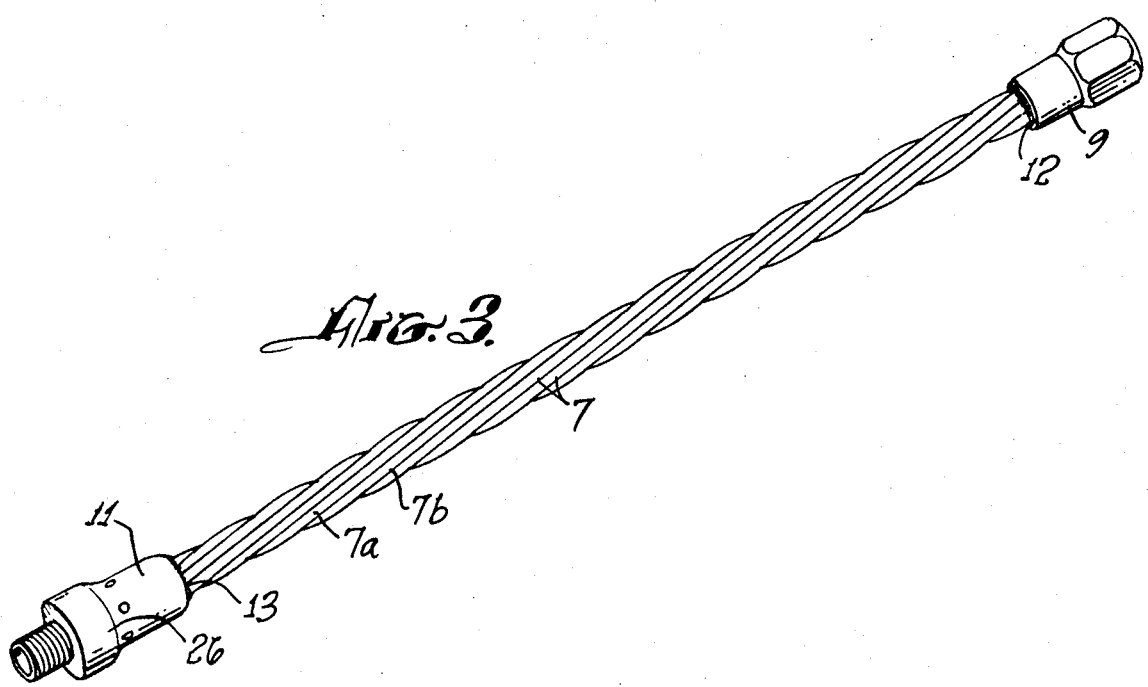
FIG. 3 is a side elevation of the spirally wound electrode of the present invention including certain end fittings used in attaching the electrode to the gun.

The arc-welding gun shown in FIG. 1 is conventional to the extent that it employs a gun body portion 1 supplied through conduits 2 or the like with such essentials as the electrical current for producing the welding arc, the welding metal that is fused into the work by the arc, and an inert gas customarily used to shield the welding operation and prevent contamination. A handle and trigger arrangement 3 provide the controls for the gas and current supply and, of course, permit the operator to hold the gun and direct it at the seam or other welding operation to be performed. A gun nozzle 4 establishes the welding arc, feeds the welding metal and discharges the inert gas envelope. A gun barrel 5 customarily carries nozzle 4 and is coupled into gun body portion 1.

As has been indicated, the present invention primarily is concerned with providing the gun nozzle with complete flexibility so as to permit the nozzle to be disposed in any desired bent position needed to reach otherwise inaccessible or difficult locations. In contrast, most of the commercially available gas metal arc-welding guns, such as the Bernard or the Linde guns, have rigid barrels which may be either straight or provided with a preset, fixed bend. In any event, such commercial guns do not appear to have the presently-desired flexibility and, even though the prior art contains several attempts to provide the flexibility, apparently these attempts have not received commercial approval.

Primarily, the present invention is intended as an accessory attachment capable of being used with any of the standard commercial gun types to provide the desired flexibility without sacrificing performance. As shown in FIG. 1, the attachment is identified as a flexible barrel portion 5 used to operatively couple a commercial nozzle 4 to its gun body portion 1. When used as an attachment, the fittings or couplings used to connect the barrel may assume a wide variety of forms dependent upon the particular type of gun being employed. However, it is not intended that the invention be used only as an accessory or attachment for standard gun types, since, if desired, wholly new gun arrangements incorporating the principles of the invention easily can be provided.

Figure 4:
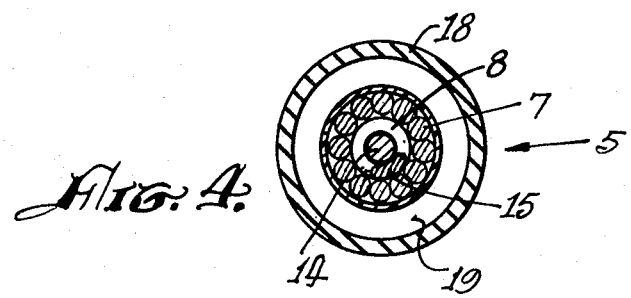
FIG. 4 is a section taken along lines 44 of FIG. 2.

One of the primary features of the present invention resides in its use of a special tubular electrode member 7 to carry the welding current to nozzle 4. This electrode is shown attached to nozzle 4 in FIG. 2 and by itself in FIG. 3. Referring to FIGS. 2–4 electrode 7 is formed of a plurality of tightly wound wires 7a, 7b, etc., the wires preferably being solid copper wires of whatever size may be needed for the particular amperage to be carried. By way of illustration, a suitable electrode can be provided using twelve strands of No. 12 solid copper wiring wound together to provide a tubular structure having an open center or bore 8, the convolutions of the winding being closely adjacent one to the other to provide a maximum number of turns per inch, this particular feature providing improved bending or flexibility along with substantially reduced fatigue tendencies. Other types of spiral windings which do not employ the twelve strands, of course, can be employed providing the spiral winding permits the desired flexibility and, in particular, permits the electrode to maintain any set angle to which it is bent. A special type of wire is not needed for the electrode, although the selection of the wire should take into account such factors as its flexibility, fatigue capacity and current-carrying capability. For example, the size of the wire can be varied to accommodate the amount of welding current to be carried from the gun to the nozzle. Fittings 9 and 11 (FIG. 3) are coupled one to each end of the spiral electrode winding and, although these fittings will be considered in more detail, it should be noted that they each are silver-soldered at points 12 and 13 to the copper wire of the electrode so as to admit the current supplied to gun body 1 and supply the current to nozzle 4.

Referring again to FIG. 2, conventional welding metal in the form of welding wire 14 is supplied to nozzle 4 through bore 8 of the electrode. In most welding operations wire 14 is constantly fed as the welding operation proceeds and, to assure a constantly smooth feeding operation, the present arrangement incorporates a special wire guide member 15 in the form of an elongate steel spring extending the length of the bore. Although other types of wire guide members might be substituted, the steel spring has been found particularly beneficial in that it not only provides a flexibility along its entire length but, in addition, the spring exerts a radially outward force on the wire windings of electrode 7 so as to assist in maintaining the convolutions or windings of this electrode disposed in their initially set circular path even when the electrode is flexed or bent into an operative position. As shown, the coiled spring 14 has a bore or central opening sized to closely receive welding wire 14.

Another beneficial feature of the arrangement is its use of a flexible support sleeve 16 again extending the full length of electrode 7, this sleeve, preferably, binding or being in close contact with the outer surfaces of the wire windings of electrode so as to maintain the circularity of windings during bending or, in other words, to minimize the crimping or flattening of the wires. Such a sleeve may be provided by a one-half inch glass tape helically wound about the coils of the electrode and, if desired, a gum-type tape can be employed. Other types of sleeves, such as a braided metal stocking or sleeve closely fitted about the windings, can be used. If desired, the sleeve can be formed of braided copper in which case it assists in carrying or conducting the welding current. In either case, the sleeve assists in maintaining the circularity of the helical windings of the electrode. As will be appreciated, there will be a tendency for the windings of the electrode to crimp when bent. This tendency is effectively counteracted by the sleeve which, in effect, prevents the coils from spreading sufficiently to allow any sharp crimping. Instead, longitudinal flexing of this electrode arrangement results in bends having a rather large radius of curvature in contrast to bends having a sharp radius in which the coiled members might become crimped and the passages through these members closed. Viewed in this regard, the use of sleeve 16 is beneficial in maintaining the bore opening used for feeding welding wire 14. Any sleeve or plurality of sleeve members which provide these beneficial functions can be used. However, the gummed glass tape is simple, inexpensive and, in addition it cools the welding operation. However, experience has demonstrated that the entire arrangement runs in a rather cool manner due principally to the use of the multi-strand spirally-wound electrode.

The electrode arrangement is completed by employing a neoprene insulator sleeve 18 disposed about glass tape sleeve 16. Preferably, sleeve 18 is spaced from sleeve 16 to provide an annular passage way 19 through which the inert gas can pass as it moves from the gun body to the nozzle. However, with some obvious modifications the gas could be transmitted through bore 8 of the electrode.

The various fittings or coupling members used at the end portions of the electrode arrangement are adapted not only to physically couple the arrangement into the gun but also to electrically couple the current-carrying electrode and to direct the flow of the inert gas. Referring to FIGS. 2 and 3, it first may be noted that electrode 7 carries a standard hexagonal attachment nut 9 at its gun-body end, this nut being silver-soldered at point 12 to the windings. A suitable gun adapter member 21 is mounted over this end, the adapter being threaded externally for engagement with the gun. Nut 9 extends into gun adapter 21 where it is threaded to receive a contact tube 22. The particular tube shown in the drawing is adapted for use with a particular commercial gun and, of course, the shape and size of the tube will vary dependent upon the type of gun being employed. Contact tube 22 is the equivalent of similar members used in commercial guns to receive welding wire 14 and to be energized by the welding current supplied to the gun. The rearward end of gun adapter 21 mounts neoprene sleeve insulator 18. The inert gas for the welding operation is passed through the adapter into annular passage 19.

The nozzle end of the electrode arrangement mounts fitting 11 which, again, is silver-soldered at point 13 (FIG. 3). Fitting 11 is a ported brass lug, the ports including a plurality of openings 23 which permit the inert gas to flow from passage 19 into a central or axial passageway formed within the fitting so as to be directed on to nozzle 4. A sleeve member 24 is fitted over a radially-enlarged flange portion 26 of fitting 11 and neoprene sleeve 20 is mounted on sleeve 24. Consequently, the gas is constrained by flange 26 to flow inwardly through ports 23. In the illustrated arrangement, a hollow-centered adapter member 27 is threaded on to fitting 11 and a nozzle tip, identified by numeral 28, is carried by the adapter. The nozzle itself includes a casing 29 mounted on adapter 27 the casing being insulated by another sleeve 31. As has been indicated, these members are representative of commercially-available nozzles and other forms, of course, are contemplated.

Operation of the illustrated embodiment should be reasonably apparent. First, if barrel 5 is to be used as an accessory attachment, it of course, must be substituted for the barrel portion supplied with the commercial gun. Next, the operator flexibly bends the coupled electrode arrangement into any desired disposition which may include reverse bends if so desired or bends at several points throughout the length of the electrodes so as to permit the nozzle to be fitted around several corners or protuberances. With the gun coupled to sources of electrical current, inert gas and welding wire metal, the operator is capable of supplying these sources to nozzle 4 by manipulating the controls provided by the gun itself. Regardless of the degree to which the electrode arrangement may be bent, the supply of the current and the welding wire and gas is smooth and unrestricted due to the fact that the paths for these supplies remain open. The supply of inert gas can be further assured by passing the gas through both the tube bore and annular passage 19. As has been indicated, the operation of the present arrangement appears unusually cool and certainly as safe and free from injury or damage as unmodified commercial guns. Also, it has been found that repeated bending of this electrode arrangement has had essentially no fatiguing effect upon the electrode itself. For example, units constructed in the illustrated manner have been in constant daily use for a period of over a year without demonstrating appreciable fatigue. As should be apparent, flexibility can be improved by using flexible fittings in lieu of the rigid fittings which have been described.

The electrode arrangement has been described primarily with reference to its primary use in gas metal arc-welding guns. Obviously it also can be used to considerable advantage in other arc-producing guns which may not employ inert gas or even welding wire. For example, the electrode is suitable for use with arc air cutters which creates an arc to cut or burn the metal to which the arc is applied. These cutters also include a current-carrying electrode which advantageously can be formed of spiral windings in the manner already described. Further, these cutters may use a source of gas, such as air, to promote the arc. This gas source can be supplied to the arcing tip, or 'stinger', through the electrode arrangement in the same manner as the inert gas is supplied in the welding operation. Cutters of this general type are well-known commercial devices that can be provided with the desired flexibility by coupling the electrode arrangement between their 'stingers' and the current source. As should be apparent, the term 'stinger' is, in effect, a nozzle comparable to the gas metal arc welding nozzle.

Obviously, many modifications and variations of the present invention are possible in the light of the above teachings. It is therefore to be understood that within the scope of the appended claims the invention may be practiced otherwise than as specifically described.

We claim:

1. Flexible apparatus for supplying electrical energy, welding gas and welding wire to the nozzle of a welding gun, said apparatus comprising:
   an elongate member formed of electrically-conductive wire spirally wound in a circular path to provide a tube-shaped electrode capable of being bent longitudinally and of retaining its bent position,
   a flexible support sleeve enveloping said electrode for resisting the tendency of said spiral winding to flatten during bending,
   a flexible insulating sleeve protectively surrounding said support sleeve, said sleeves being disposed in a radially-spaced disposition providing a continuous longitudinal path for said welding gas,
   welding wire guide means mounted in the bore of said tubular electrode, and
   means for operatively coupling one end of the electrode to said gun and the other to said nozzle whereby welding current is supplied to the nozzle through said electrode windings and welding wire fed to the nozzle through said electrode bore.

2. The apparatus of claim 1 wherein said welding wire guide means is in the form of an elongate coil spring extending substantially the length of said electrode bore.

3. The apparatus of claim 1 wherein said elongate electrode member is formed of a plurality of closely-wound solid wires.

4. The apparatus of claim 1 wherein said support sleeve is provided by a layer of glass tape spirally wound about the full length of said electrode member.

5. The apparatus of claim 1 wherein said coupling means includes a pair of electrically-conductive fittings electrically coupled to said electrode, each of said fittings having a circular flange portion of greater diameter than said electrode member,
   said elongate insulating sleeve having its end portions mounted on said flanges for providing said radial spacing.

* * * * *